(12) United States Patent
Ohnuki

(10) Patent No.: US 7,936,149 B2
(45) Date of Patent: May 3, 2011

(54) CHARGING DEVICE

(75) Inventor: Yasumichi Ohnuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 871 days.

(21) Appl. No.: 11/905,762

(22) Filed: Oct. 3, 2007

(65) Prior Publication Data

US 2008/0084184 A1 Apr. 10, 2008

(30) Foreign Application Priority Data

Oct. 4, 2006 (JP) ................... 2006-272504

(51) Int. Cl.
*H02J 7/00* (2006.01)
*H02J 1/00* (2006.01)
(52) U.S. Cl. ........ 320/119; 320/166; 320/122; 320/124; 320/125; 307/36; 307/46
(58) Field of Classification Search ................. 320/119, 320/166
See application file for complete search history.

(56) References Cited

U.S. PATENT DOCUMENTS

| 6,362,597 B2 * | 3/2002 | Leppo et al. ................. 320/116 |
| 6,583,602 B2 * | 6/2003 | Imai et al. ..................... 320/118 |
| 2002/0109482 A1 * | 8/2002 | Anzawa et al. ............... 320/119 |
| 2004/0037100 A1 * | 2/2004 | Orr et al. ....................... 363/131 |
| 2009/0067200 A1 | 3/2009 | Bolz et al. |

FOREIGN PATENT DOCUMENTS

| JP | 11-032443 A | 2/1999 |
| JP | 11-032443 A | 2/1999 |
| JP | 2000-092732 A | 3/2000 |
| JP | 2001-037077 A | 2/2001 |
| JP | 2001-339865 A | 12/2001 |
| JP | 2002-223528 A | 8/2002 |
| JP | 2003-070179 A | 3/2003 |
| WO | WO 2006/000263 A1 | 1/2006 |
| WO | WO 2006/000471 A1 | 1/2006 |

* cited by examiner

*Primary Examiner* — Edward Tso
*Assistant Examiner* — Yalkew Fantu
(74) *Attorney, Agent, or Firm* — Arent Fox LLP

(57) ABSTRACT

A charging device has an electric accumulator (20) formed by a plurality of series-connected electric accumulator cells (E1, E2, ..., En), one electrode of any one of the electric accumulator cells being used as a reference potential of the electric accumulator (20); at least one capacitor (C1) having one end fixed to the potential of one electrode of each of the electric accumulator cells (E1, E2, ..., En) or fixed to the potential of the other electrode of any one of the electric accumulator cells (E1, E2, ..., En) through a rectifying means (D11, D12); and a periodical power source (30) connected between the capacitor (C1) and the reference potential of the electric accumulator to generate repetitive signals.

12 Claims, 11 Drawing Sheets

CELL IS CHARGED BY CAPACITOR

CAPACITOR IS RECHARGED

CHARGING DEVICE

CROSS-REFERENCE TO RELATED APPLICATION(S)mumbling

This application claims the foreign priority benefit under Title 35, United States Code, §119 (a)-(d), of Japanese Patent Application No. 2006-272504 filed on Oct. 4, 2006 in the Japan Patent Office, the disclosure of which is herein incorporated by reference in its entirety.

BACKGROUND OF THE INVENTION

1. Field of the Invention

The present invention relates to a charging device for charging an electric accumulator formed by a plurality of series-connected electric accumulator cells.

2. Description of the Related Art

More and more electric vehicles such as electric cars, fuel-cell-powered cars and hybrid cars have been putting into practical use in order to achieve low emissions, low noise and low gasoline consumption. Such electric vehicles are each equipped with a high voltage battery for driving a running motor. The high voltage of the high voltage battery is obtained by connecting a plurality of low voltage battery cells in series. Due to the high voltage of the high voltage battery, the current flowing through the running motor can be reduced compared with that of a low voltage battery when driving the running motor at the same power level, and therefore the weight of electric wires can be reduced.

Because the characteristic of each of the plurality of series-connected battery cells will vary while repeating charged and discharged, difference in the charging amount will be gradually caused from cell to cell. At the time when the charging amount of any one of the plurality of battery cells reaches a charging upper limit, charging operation has to be stopped even if the other battery cells have not been fully charged; at the time when the charging amount of any one of the plurality of battery cells reaches a charging lower limit, the discharging operation has to be stopped. In other words, since the series-connected battery cells early reach the charging upper limit or charging lower limit, usable charging capacity of the series-connected battery cells is actually decreased. Further, as a failure of the battery, a fine short circuit may occur. In the case where the fine short circuit occurs, the failed battery cell will discharge more quickly than the other battery cells.

To equalize the charging amount for each of the battery cells, there is a proposal in which a series circuit formed by a resistor and a semiconductor switch is connected to both ends of each battery cell to allow each battery cell to appropriately discharge (see Japanese Patent Laid-Open Publication No. 2000-92732, Japanese Patent Laid-Open Publication No. 2001-37077 and Japanese Patent Laid-Open Publication No. 2003-70179). Further, there is another proposal in which a transformer winding and a switching element are connected to each battery cell in order to equalize the charging voltage for each of the battery cells (see Japanese Patent Laid-Open Publication No. 2002-223528 and Japanese Patent Laid-Open Publication No. 2001-339865). In the technique that uses the resistor to discharge each of the battery cells, it is necessary to employ a high breakdown voltage semiconductor switch and a complicated supplementary circuit. Further, in the technique that uses the transformer to achieve insulation, it will be difficult to achieve integration and miniaturization since the transformer has relatively large volume.

In order to reduce the aforesaid problems, there is another proposal in which a capacitor is connected between each of the battery cells and an AC power source to insulate the battery cell from the AC power source, and the variable voltage of the AC power source is superposed on the voltage between the both ends of the capacitor to charge the battery cell (see Japanese Patent Laid-Open Publication No. Hei 11-32443).

However, in the art disclosed in Japanese Patent Laid-Open Publication No. Hei 11-32443, since the both electrodes of each of the series-connected battery cells are insulated from the both electrodes of the AC power source, in the case where a common mode noise is applied between the battery cell and the AC power source (which is a periodical power source), there is concern that a noise voltage will be brought into the battery cell when performing charge. Further, in the art disclosed in Japanese Patent Laid-Open Publication No. Hei 11-32443, a single AC power source is used to simultaneously supply the same voltage to the plurality of battery cells (the electric accumulator cells).

SUMMARY OF THE INVENTION

The present invention relates to a charging device capable of charging any one of a plurality of electric accumulator cells of an electric accumulator while less subject to the effect of a common mode noise generated between the electric accumulator cells and a periodical power source.

A charging device according to a first aspect of the present invention includes: an electric accumulator formed by a plurality of series-connected electric accumulator cells, one electrode of any one of the electric accumulator cells being used as a reference potential of the electric accumulator; at least one capacitor having one end fixed to the potential of one electrode of each of the electric accumulator cells or fixed to the potential of the other electrode of any one of the electric accumulator cells through a rectifying means; and a periodical power source connected between the capacitor and the reference potential of the electric accumulator to generate repetitive signals.

With such a configuration, each electrode of the electric accumulator cells and the periodical power source are insulated from each other via the capacitor, and the capacitor is charged by a voltage equal to the potential difference between the potential of each electrode of the electric accumulator cells and the output voltage of the periodical power source. Thus, each of the electric accumulator cells is charged by a voltage equal to the amplitude of the periodical power source through the capacitor and the rectifying means. Herein, an AC power source, a periodical power source and the like may be used as the periodical power source, and a battery, a super capacitor and the like may be used as the electric accumulator. Incidentally, it is preferred that the amplitude of the output voltage of the periodical power source is larger than the potential difference between the potential of one electrode of each of the electric accumulator cells and the potential of the other electrode of any one of the electric accumulator cells. Further, since one electrode of any one of the electric accumulator cells and the periodical power source are connected to the reference potential, effect of the common mode noise is reduced.

According to a second aspect of the present invention, it is preferred that in the charging device according to the first aspect of the present invention, the periodical power source is a rectangular wave power source which alternately outputs a high momentary voltage and a low momentary voltage, and the rectifying means fixes the one end of the capacitor either to the potential of the one electrode or to the potential of the other electrode, whichever is higher, when the rectangular wave power source outputs the high momentary voltage, and fixes the one end of the capacitor either to the potential of the one electrode or to the potential of the other electrode, whichever is lower, when the rectangular wave power source outputs the low momentary voltage.

With such a configuration, when the rectangular wave power source outputs the high momentary voltage, the plurality of the electric accumulator cells connected between the reference potential and either of the one electrode and the other electrode, whichever has higher potential, are charged through the electrode having higher potential. When the rectangular wave power source outputs the low momentary voltage, at least one of the electric accumulator cells connected between the reference potential and either of the one electrode and the other electrode, whichever has lower potential, is discharged through the electrode having lower potential. By performing the aforesaid charge and discharge, only the electric accumulator cell(s) connected between the one electrode and the other electrode is charged.

According to a third aspect of the present invention, it is preferred that in the charging device according to the second aspect of the present invention, the periodical power source includes a first periodical power source and a second periodical power source which has an inverted phase with respect to the first periodical power source, and the capacitor includes a first capacitor and a second capacitor, the other end of the first capacitor being fixed to the voltage of the first periodical power source and the other end of the second capacitor being fixed to the voltage of the second periodical power source.

With such a configuration, since the first rectangular wave power source and the second rectangular wave power source have opposite phases from each other, one has high potential and the other has low potential. Thus, the capacitor connected to the rectangular wave power source having higher potential is fixed either to the potential of the one electrode or to the potential of the other electrode of the electric accumulator cells, whichever is higher. Further, the capacitor connected to the rectangular wave power source having lower potential is fixed either to the potential of the one electrode or to the potential of the other electrode of the electric accumulator cells, whichever is lower. Thus, a current flows through between the rectangular wave power source having higher potential and the rectangular wave power source having lower potential via the capacitor connected to the rectangular wave power source having higher potential, the electric accumulator cells connected between the one electrode and the other electrode, and the capacitor connected to the rectangular wave power source having lower potential.

A charging device according to a fourth aspect of the present invention can charge any one of a plurality of series-connected electric accumulator cells which form an electric accumulator, the charging device including: a charging circuit and a rectangular wave power source, wherein the charging circuit has a plurality of sub circuits for each of the electric accumulator cells, the sub circuits each having a first diode, a second diode and a capacitor, an anode of the first diode and a cathode of the second diode being connected to one end of the capacitor, a cathode of the first diode being connected to a positive electrode of each of the electric accumulator cells, an anode of the second diode being connected to a negative electrode of each of the electric accumulator cells, and wherein the rectangular wave power source applies a rectangular wave voltage to the other end of the capacitor of any one of the sub circuits of the charging circuit.

When the rectangular wave power source outputs the high momentary voltage, the electric accumulator cells are charged through the capacitor and the first diode. When the rectangular wave power source outputs the low momentary voltage, the electric accumulator cell(s) connected to the reference potential is discharged through the capacitor and the second diode. By performing the charge and discharge in such a manner, only the electric accumulator cell connected between the first diode and the second diode is charged.

A charging device according to a fifth aspect of the present invention can charge any one of a plurality of series-connected electric accumulator cells which form an electric accumulator, the charging device including: a charging circuit and a rectangular wave power source, wherein the charging circuit has a plurality of sub circuits for each of the electric accumulator cells, the sub circuits each having a first diode, a second diode, a third diode, a fourth diode, a first capacitor and a second capacitor, an anode of the first diode and a cathode of the second diode being connected to one end of the first capacitor, a cathode of the first diode being connected to a positive electrode of each of the electric accumulator cells, an anode of the second diode being connected to a negative electrode of each of the electric accumulator cells, an anode of the third diode and a cathode of the fourth diode being connected to one end of the second capacitor, a cathode of the third diode being connected to a positive electrode of each of the electric accumulator cells, an anode of the fourth diode being connected to a negative electrode of each of the electric accumulator cells, and wherein the rectangular wave power source applies a rectangular wave voltage to the other end of the first capacitor and applies an inverted voltage obtained by inverting the rectangular wave voltage to the other end of the second capacitor of any one of the sub circuits of the charging circuit.

With such a configuration, since the first rectangular wave power source and the second rectangular wave power source have opposite phases from each other, one has high potential and the other has low potential. When the first rectangular wave power source outputs the high momentary voltage, a current flows toward the second rectangular wave power source through a path of: the first capacitor, the first diode, the electric accumulator cell, the fourth diode, and the second capacitor, so that the electric accumulator cell is charged. When the second rectangular wave power source outputs the high momentary voltage, a current flows toward the first rectangular wave power source through a path of: the second capacitor, the third diode, the electric accumulator cell, the second diode, and the first capacitor, so that the electric accumulator cell is charged. In other words, the electric accumulator cell is charged both when the first rectangular wave power source outputs the high momentary voltage and when the second rectangular wave power source outputs the high momentary voltage.

According to a sixth aspect of the present invention, it is preferred that in the charging device according to the fifth aspect of the present invention, a center voltage of the rectangular wave voltage has a fixed potential difference from a center voltage of the inverted voltage. With such a configuration, the electric accumulator cell is charged corresponding to the change of the amplitude of the rectangular wave voltage and the change of the amplitude of the inverted voltage.

According to a seventh aspect of the present invention, it is preferred that in the charging device according to the fourth or sixth aspect of the present invention, one electrode of any one of the electric accumulator cells has the same potential as a reference potential of the rectangular wave power source. With such a configuration, the effect of the common mode noise generated between the electric accumulator cells and the rectangular wave power source can be reduced.

According to an eighth aspect of the present invention, it is preferred that in the charging device according to any one of the fourth to seventh aspects of the present invention, at least one of a resistor and an inductor is provided in a current flow path between the electric accumulator and the rectangular wave power source. With such a configuration, the transient current can be reduced.

DETAILED DESCRIPTION OF PREFERRED EMBODIMENT(S)

First Embodiment

A charging device according to a first embodiment of the present invention will be described below with reference to the attached drawings.

Figure 1:
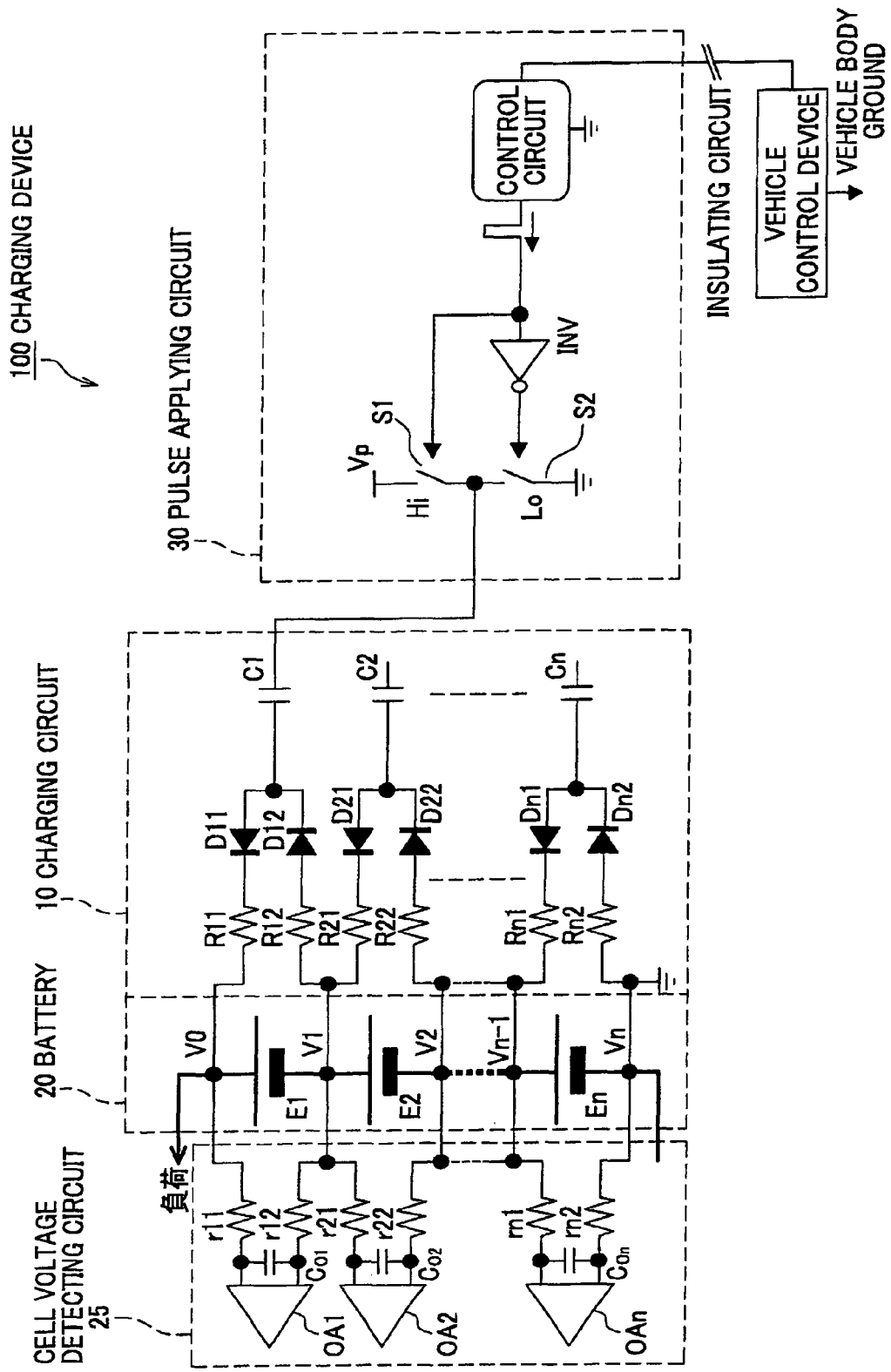
FIG. 1 is a circuit diagram showing a charging device according to a first embodiment of the present invention.

A charging device 100 shown in FIG. 1 includes a battery 20 formed by connecting n battery cells (electric accumulator cells) E1, E2, . . . , En in series, a charging circuit 10 for charging each of the battery cells (electric accumulator cells) E1, E2, . . . , En, a pulse applying circuit 30 which is a periodical power source (a rectangular wave power source) for generating a rectangular wave to drive the charging circuit 10, and a cell voltage detecting circuit 25 for measuring the voltage of each of the battery cells (the electric accumulator cells) E1, E2, . . . , En. Incidentally, the battery 20 is connected to a load. Further, the pulse applying circuit 30 is connected through an insulating circuit, to a vehicle control device which is grounded to a vehicle body. A reference potential of the battery 20, the charging circuit 10 and the pulse applying circuit 30 is insulated from a vehicle body, instead of being grounded to the vehicle body.

The potentials of both ends of the battery 20 (a representative example of the battery 20 is a lithium-ion battery) are respectively retained to V0 and Vn, the potentials of the connection points of the battery cells (the electric accumulator cells) E1, E2, . . . , En are respectively retained to V1, V2, . . . , Vn-1. In other words, the potentials of the load and the potentials of the connection points of the battery cells E1, E2, . . . , En are V0, V1, V2, . . . , Vn-1, Vn. The cell voltage detecting circuit 25 includes n detecting circuits so that the potential difference of each of the battery cells E1, E2, . . . , En can be detected. The detect circuits each includes an operational amplifier circuit OA1, OA2, . . . , OAn, a capacitor $C_{O1}, C_{O2}, \ldots, C_{On}$ connected to the input side of the respective operational amplifier circuit OA1, OA2, . . . , OAn in parallel, and two resistors r11, r12, r21, r22, . . . , rn1, rn2 each having one end connected to one end of the respective capacitor $C_{O1}, C_{O2}, \ldots, C_{On}$, and the other end connected to one of the connection points of the battery cells E1, E2, . . . , En. A normal mode noise is prevented by the capacitor $C_{O1}, C_{O2}, \ldots, C_{On}$ and the resistors r11, r12, r21, r22, . . . , rn1, rn2. Incidentally, the detecting circuits are adapted to equalize the charging amount for each of the battery cells E1, E2, . . . , En, and therefore the detecting circuits can be eliminated for a charging device that does not perform equalization. Incidentally, an isolation amplifier is preferably to be used for the operational amplifier circuit OA1, OA2, . . . , OAn.

The charging circuit 10 that characterizes the present embodiment will be described below. Note that since each of the battery cells E1, E2, . . . , En has the same circuit, the present embodiment will be described based on the battery cell E1. A cathode of a diode D11 is connected to a positive electrode of the battery cell E1 via a resistor R11 which restricts the current, and an anode of a diode D12 is connected to a negative electrode of the battery cell E1 via a resistor R12. An anode of the diode D11 and a cathode of the diode D12 are connected to one end of a capacitor C1, and an output signal of the pulse applying circuit 30 is input to the other end of the capacitor C1. Incidentally, a negative electrode of the battery cell En is used as the reference potential of the charging device.

The pulse applying circuit 30 includes a plurality of circuits each applying a pulse voltage to the other end of each of the capacitors C1, C2, . . . , Cn of the charging circuit 10. In order to facilitate the description, only a circuit connected to the other end of the capacitor C1 will be discussed below. In the pulse applying circuit 30, the potential of a series circuit formed by a switch S1 on a Hi side and a switch S2 on a Lo side is retained to a power source potential Vp from the reference potential, and the connection point of the switch S1 and the switch S2 is connected to the other end of the capacitor C1. The switch S1 is controlled by a pulse voltage output by a control circuit, and the switch S2 is controlled by an inverted signal obtained by inverting the pulse voltage by an inverter INV. With such an arrangement, when the switch S1 is switched from OFF state to ON state and the switch S2 is switched from ON state to OFF state, the potential of the other end of the capacitor C1 is shifted from the reference potential to the power source potential Vp. Conversely, when the switch S1 is switched from ON state to OFF state and the switch S2 is switched from OFF state to ON state, the potential of the other end of the capacitor C1 is shifted from the power source potential Vp to the reference potential.

The operation of the charging device 100 will be described below with reference to FIG. 2A and FIG. 2B.

Figure 2A:
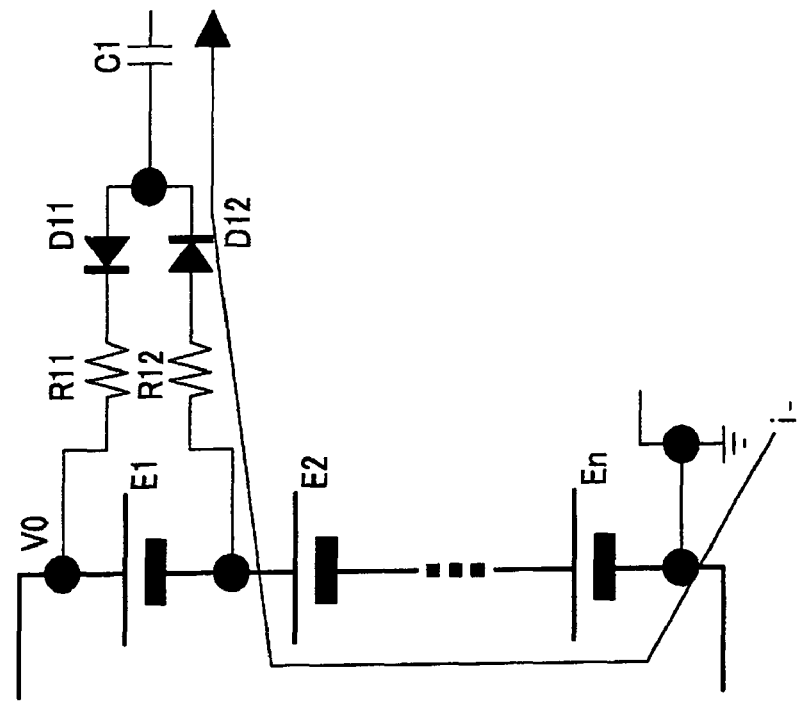
FIG. 2A and FIG. 2B circuit diagrams each explaining an operation of the charging device according to the first embodiment of the present invention.
Figure 2B:
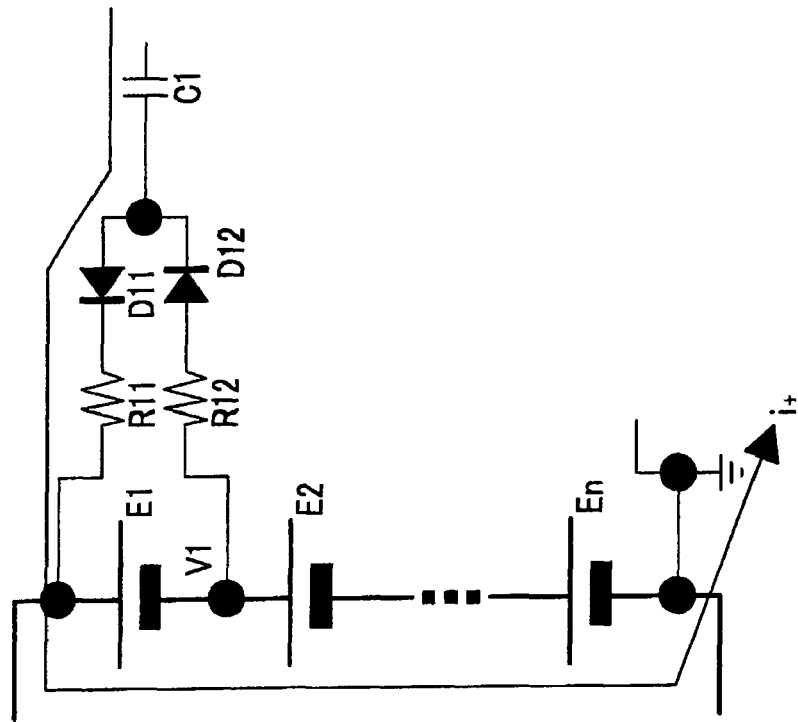

FIG. 2A explains the operation of the charging device when the potential of the other end of the capacitor C1 is shifted from the reference potential to the power source potential Vp so that the cell is charged by the capacitor, and FIG. 2B explains the operation of the charging device when the potential of the other end of the capacitor C1 is shifted from the power source potential Vp to the reference potential so that the capacitor is recharged.

As shown in FIG. 2A, when the potential of the other end of the capacitor C1 is shifted from the reference potential to the power source potential Vp (see FIG. 1), since the potential of the capacitor C1 as a whole rises by the power source potential Vp, a current i+ flows through the battery cells E1, E2, . . . , En via the capacitor C1, the diode D11 and the resistor R11. On the other hand, since the cathode potential V1 of the battery cell E1 is lower than the potential of the capacitor C1 whose potential has risen by the power source potential Vp, the diode D12 becomes OFF state. Thus, the capacitor C1 is discharged, so that the potential of the one end of the capacitor C1 connected to the diode converges to the potential V0. Incidentally, the power source potential Vp (the momentary voltage of the rectangular wave voltage) is higher than the reference potential.

As shown in FIG. 2B, when the potential of the other end of the capacitor C1 is shifted from the power source potential Vp to the reference potential, since the potential of the capacitor C1 as a whole is deceased by the power source potential Vp, a current i- is discharged from the battery cells E2, . . . , En via the resistor R12, the diode D12 and the capacitor C1. On the other hand, since the anode potential V0 of the battery cell E1 is higher than the potential of the capacitor C1 whose potential has been decreased by the power source potential Vp, the diode D11 becomes OFF state. Thus, the capacitor C1 is charged, so that the potential of the one end of the capacitor C1 connected to the diode converges to the potential V0.

The battery cells E1, E2, . . . , En are charged in a state shown in FIG. 2A and the battery cells E2, . . . , En are discharged in a state shown in FIG. 2B, therefore only the battery cell E1 is charged as a result.

Figure 3:
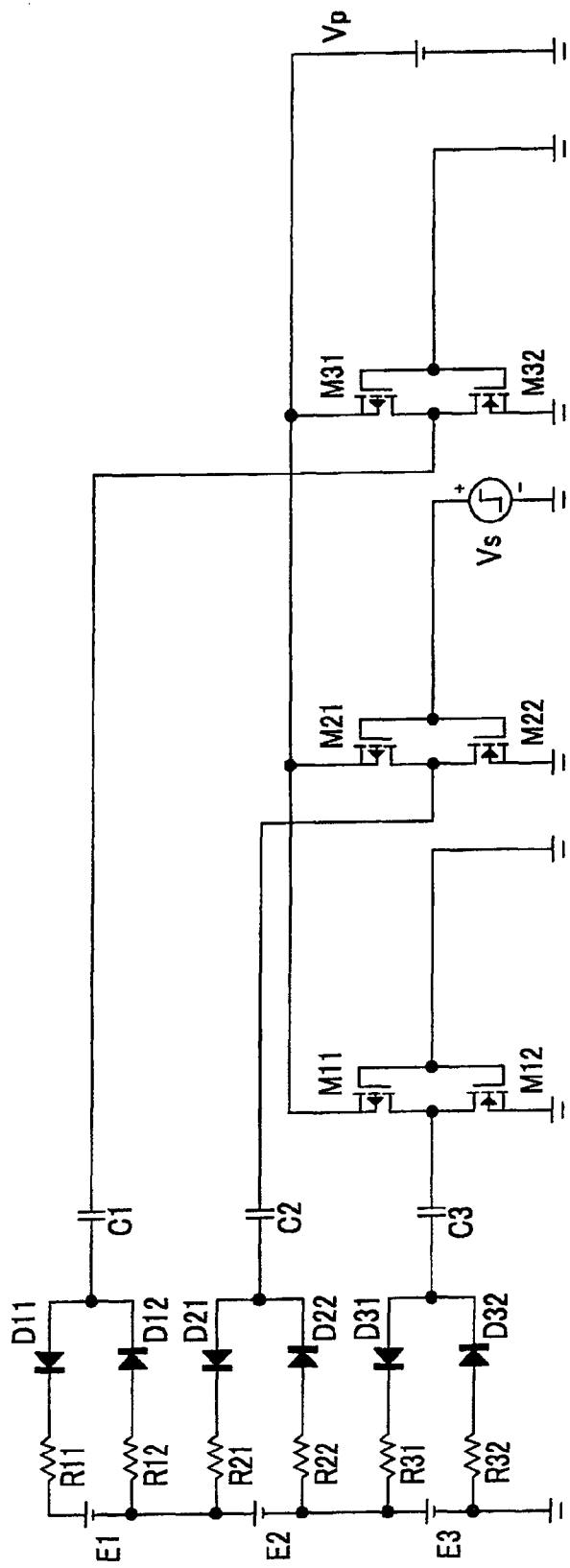
FIG. 3 is a circuit diagram showing the charging device according to the first embodiment of the present invention.

FIG. 3 is a circuit showing the charging device in a case where n=3 and where only a middle battery cell E2 is charged.

The pulse applying circuit 30 is configured by a connection circuit of p-channel MOSFETs M11, M21, M31 and n-channel MOSFETs M12, M22, M32, and a pulse signal Vs is input to gates of both the p-channel MOSFET M21 and n-channel MOSFET M22. Incidentally, the potential of gate of each of the MOSFETs M11, M12, M31, M32 is retained to the reference potential.

Figure 4A:
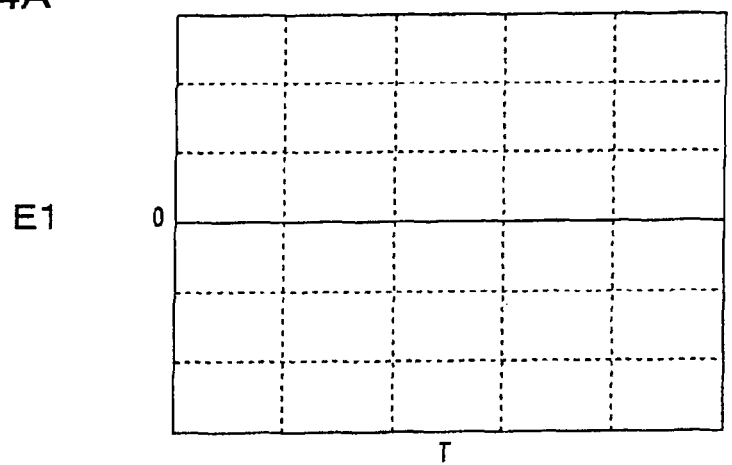
FIG. 4A to FIG. 4C each show a waveform of a current flowing through a battery cell of the charging device according to the first embodiment of the present invention.
Figure 4B:
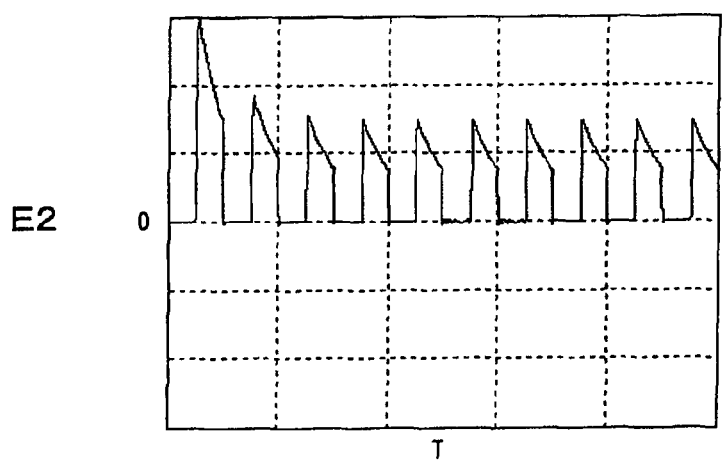
Figure 4C:
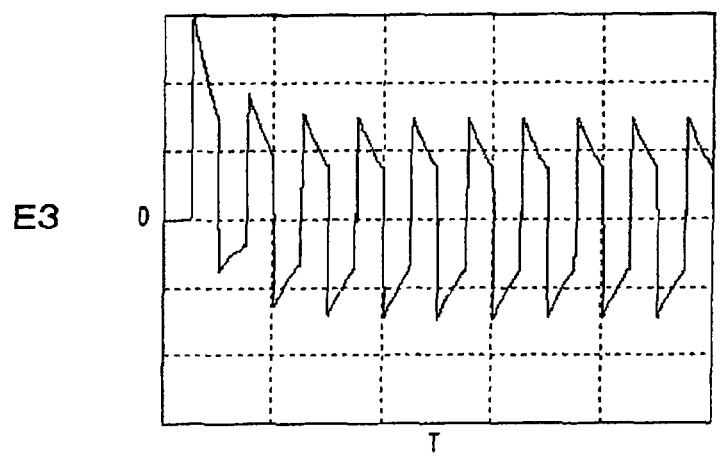

FIG. 4A shows a waveform of the current flowing through the battery cell E1, FIG. 4B shows a waveform of the current flowing through the battery cell E2, and FIG. 4C shows a waveform of the current flowing through the battery cell E3. In the circuit shown in FIG. 3, the battery cell E1 is neither charged nor discharged as shown in FIG. 4A; only the charging current flows through the battery cell E2 via the diode D21 but no discharging current flows through the battery cell E2 as shown in FIG. 4B. In the circuit shown in FIG. 3, the charging current and the discharging current alternately flow through the battery cell E3 respectively via the diode D21 and the diode D22 as shown in FIG. 4C, and the average current becomes zero in a steady state where the charging current is balanced with the discharging current.

As described above, in the first embodiment, the connection points of both the load and the battery cells E1, E2, . . . , En are insulated from the pulse applying circuit 30 via the capacitors C1, C2, . . . , Cn, and the capacitors are each charged with the voltage equivalent to the potential difference between the potential of each electrode and the potential of the pulse applying circuit 30. Further, in the time when the rectangular wave voltage generated by the pulse applying circuit 30 is retained to the power source potential Vp, the plurality of the battery cells E1, E2, . . . , En connected between the positive electrode of the battery cell E1 and the reference potential are charged via the positive electrode of the battery cell E1. Further, in the time when the voltage of the rectangular wave power source is the voltage with respect to a reference potential, a singular or a plurality of battery cell E2, E3 . . . , En connected between a connection point of the battery cells E1 and E2 and the reference potential are discharged via the connection point of the battery cells E1 and E2. By such a charge and discharge, only the battery cell E1 is charged. Further, since the battery 20 and the pulse applying circuit 30 are connected to each other at the same potential, a common mode noise is not likely to be brought into the capacitors C1, C2, Cn when performing charge.

Second Embodiment

Figure 5:
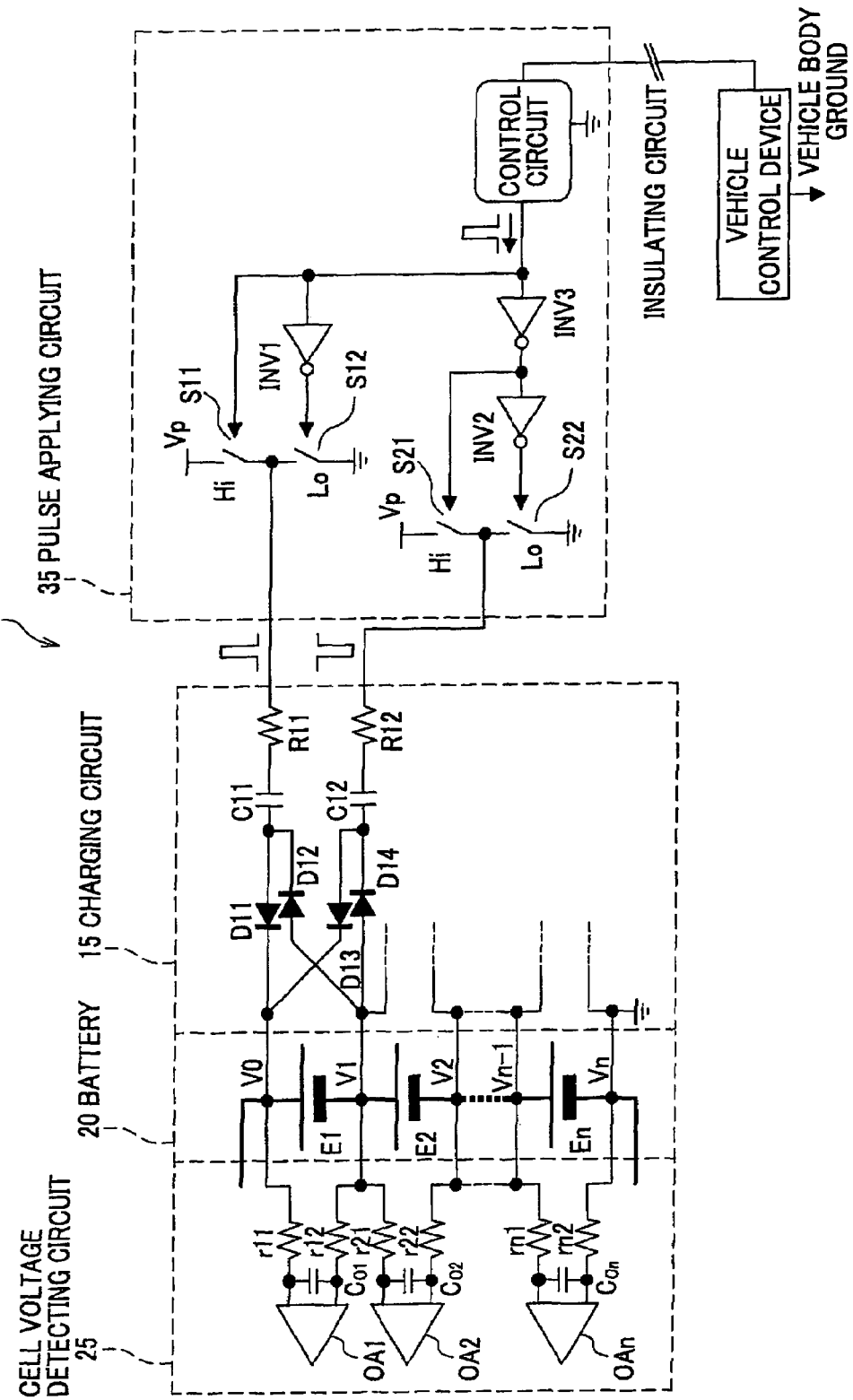
FIG. 5 is a circuit diagram showing a charging device according to a second embodiment of the present invention.

According to the first embodiment, in order to charge the battery cell E1, the other battery cells E2, E3, . . . , En are charged and discharged. However, there is also a configuration in which only the battery cell E1 is charged according to a second embodiment of the present invention. A charging device according to the second embodiment will be described below with reference to FIG. 5.

A charging device 150 includes the cell voltage detecting circuit 25, the battery 20, a charging circuit 15, and a pulse applying circuit 35. The cell voltage detecting circuit 25 and the battery 20 will not be described since they have the same configuration as that of the first embodiment. Only the charging circuit 15 and the pulse applying circuit 35 will be described below. Incidentally, similar to the first embodiment, the pulse applying circuit 35 is connected to the negative electrode, which serves as the reference potential, of battery cell En.

The charging circuit 15 charges each of the battery cells E1, E2, . . . , En. The charging circuit 15 is configured by a plurality of same circuits. For example, the circuit for charging the battery cell E1 includes diodes D11, D12, D13, D14, capacitors C11, C12, and resistors R11, R12. The cathode of the diode D11 and the cathode of the diode D13 are connected to the positive electrode of the battery cell E1 of the battery 20, and anode of the diode D12 and the anode of the diode D14 are connected to the negative electrode of the battery cell E1. Further, a pulse signal is input into the anode of the diode D11 and the cathode of the diode D12 via the capacitor C11 and the resistor R11. Further, an inverted signal obtained by inverting the pulse signal is input into the anode of the diode D13 and the cathode of the diode D14 via the capacitor C12 and the resistor R12. Incidentally, the diodes D11, D12, D13, D14 form a full-wave rectifier circuit.

The pulse applying circuit 35 generates a pulse signal to be applied to the resistor R11 of the charging circuit 15 and an inverted signal obtained by inverting the pulse signal. The potential of the series circuit formed by a switch S11 on a Hi side and a switch S12 on a Lo side is retained to a power source potential Vp from the reference potential, and a connection point of the switch S11 and the switch S12 is connected to resistor R11. The potential of the series circuit formed by a switch S21 on a Hi side and a switch S22 on a Lo side is retained to a power source potential Vp, and the connection point of the switch S21 and the switch S22 is connected to the resistor R12.

The switch S11 is controlled by a pulse voltage output from a control circuit, and the switch S12 is controlled by an inverted signal obtained by inverting the pulse voltage by an inverter INV1. The switch S21 is controlled by an inverted signal obtained by inverting the pulse signal output from the control circuit by an inverter INV3, and the switch S22 is controlled by an inverted signal obtained by inverting the inverted signal, which is inverted by the INV3, by an inverter INV2. Thus, the potential of the connection point of the switch S11 and the Switch S12 is inverted with respect to the potential of the connection point of the switch S21 and the Switch S22.

The operation of the charging device 150 will be described below with reference to FIG. 6A and FIG. 6B.

Figure 6A:
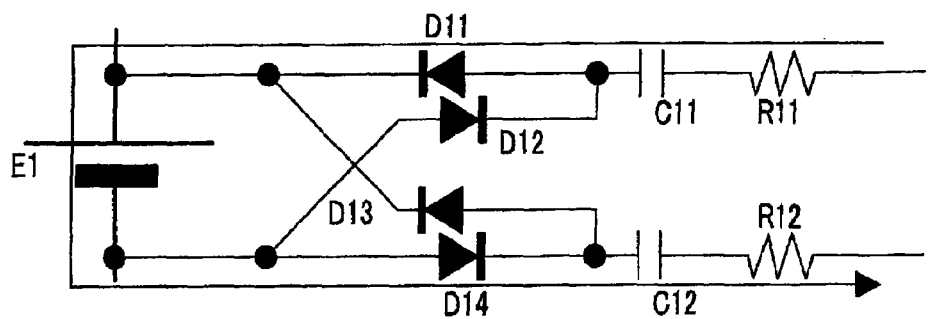
FIG. 6A and FIG. 6B are circuit diagrams each explaining an operation of the charging device according to the second embodiment of the present invention.
Figure 6B:
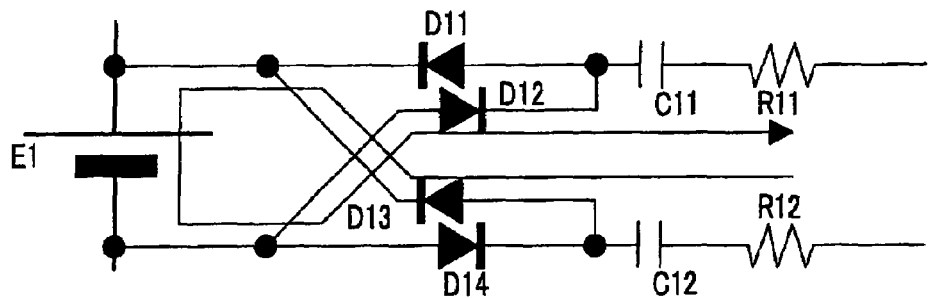

FIG. 6A shows a case where a plus pulse signal is applied to the resistor R11 and an inverted signal is applied to the resistor R12. FIG. 6B shows a case where a plus pulse signal is applied to the resistor R12 and an inverted signal is applied to the resistor R11.

As shown in FIG. 6A, the battery cell E1 is charged by passing a current through a path of: the resistor R11, the capacitor C11, the diode D11, the battery cell E1, the diode D14, the capacitor C12, and the resistor R12. In such a state, the diodes D12, D13 are in OFF state. Further, as shown in FIG. 6B, the battery cell E1 is charged by passing a current through a path of: the resistor R12, the capacitor C12, the diode D13, the battery cell E1, the diode D12, the capacitor C11, and the resistor R11. In such a state, the diodes D11, D14 are in OFF state.

A result of a circuit operation of the charging device according to the second embodiment will be described below.

Figure 7:
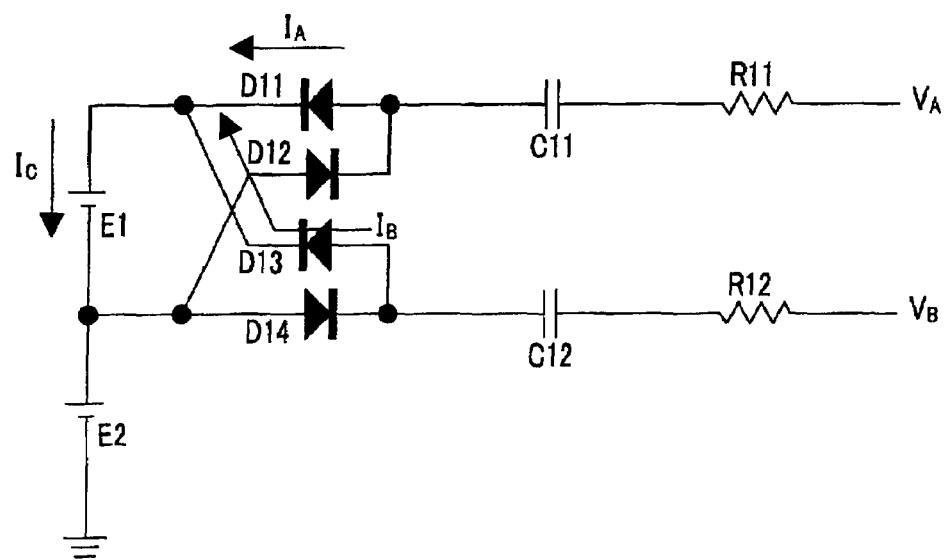
FIG. 7 is a circuit diagram showing the charging device according to the second embodiment of the present invention.

FIG. 7 shows a circuit in a case where n=2 and where only the battery cell E1 is charged. FIG. 8A to FIG. 8E each show a waveform of voltage or current of different portions of the charging device.

At this time, the current flowing through the diode D11 is a current $I_A$, the current flowing through the diode D13 is a current $I_B$, and the current flowing through the battery cell E1 is a current $I_C$.

Figure 8A:
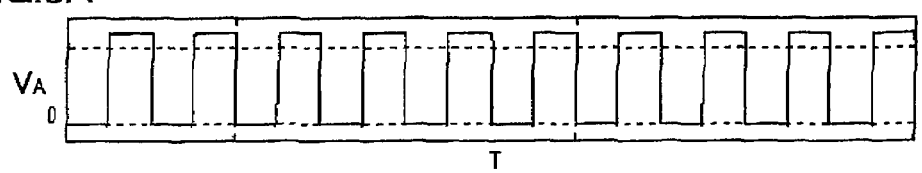
FIG. 8A to FIG. 8E each show a waveform of voltage or current of different portions of the charging device.
Figure 8B:
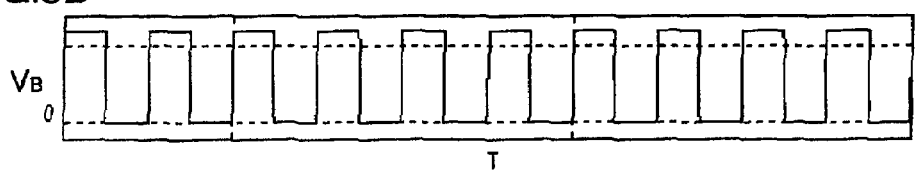
Figure 8C:
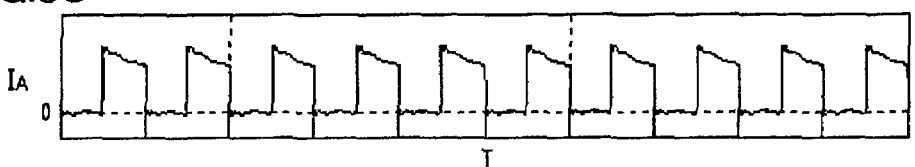
Figure 8D:
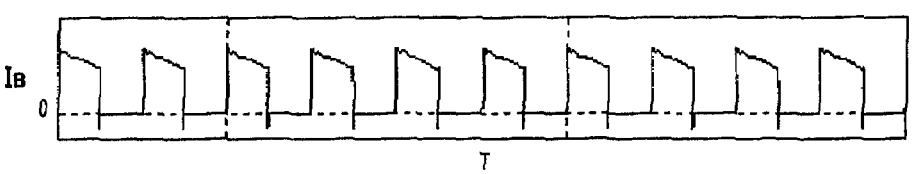
Figure 8E:
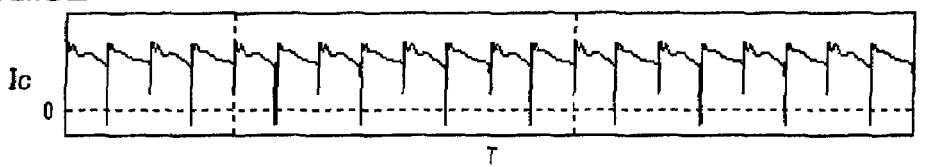

FIG. 8A shows a waveform of a pulse signal $V_A$, FIG. 8B shows a waveform of an inverted signal $V_B$, FIG. 8C shows a waveform of the current $I_A$, FIG. 8D shows a waveform of the current $I_B$, and FIG. 8E shows a waveform of the current $I_C$. The abscissa of each of these waveforms represents the time T. The current $I_A$ flows through when the pulse signal $V_A$ is in high phase, and the current $I_B$ flows through when the inverted signal $V_B$ is in high phase. Further, the current $I_C$ flowing through the battery cell E1 has a value obtained by superimposing the current $I_A$ flowing through the diode D11 and the current $I_B$ flowing through the diode D13, and is a continuous charging current.

As discussed above, according to the second embodiment, since the rectangular wave power source formed by the switches S11, S12 and the rectangular wave power source formed by the switches S21, S22 have opposite phases from each other, one rectangular wave power source has high potential and the other rectangular wave power source has low potential. For example, in the case where the rectangular wave power source formed by the switches S11, S12 has high potential, the capacitor C11 is converged and fixed to the potential of the positive electrode, which is the connection point having high potential, of the battery cell E1. Further, the capacitor C12 is converged and fixed to the potential of the negative electrode of the battery cell E1. Thus, a current flows between the both rectangular wave power sources via the capacitor C11, the battery cell E1 and the capacitor C12. Further, similar to the first embodiment, since the negative electrode of the battery 20 is used as the reference potential of the pulse applying circuit 35, the common mode noise is not likely to be brought into the capacitors C1, C2, ..., Cn when performing charge.

COMPARATIVE EXAMPLE

A comparative example will be discussed below with reference to FIG. 9A to FIG. 9C. In the first and second embodiments, the rectangular wave voltage is applied by using a pulse applying circuit 30, 35. In the present comparative example, an AC power source will be used to drive the charging circuit. As shown in the circuit diagram of FIG. 9A (refer to Japanese Patent Laid-Open Publication No. Hei 11-32443), in the charging device according to the present comparative example, four battery cells E1, E2, E3 E4 are connected in series. A cathode of each of four diodes D11, D21, D31, D41 and one end of each of four capacitors C11, C21, C31, C41 are connected to the positive electrode of each of the four battery cells E1, E2, E3 E4. An anode of each of four diodes D12, D22, D33, D42 is connected to the negative electrode of each of the four battery cells E1, E2, E3 E4. A cathode of each of four diodes D12, D22, D33, D42, an anode of each of four diodes D11, D21, D31, D41 and one end of each of four capacitors C12, C22, C32, C42 are connected to each other. The other end of each of four capacitors C11, C21, C31, C41 is connected to one end of the AC power source AC1 via each of four resistors R11, R21, R31, R41. Further, the other end of each of four capacitors C12, C22, C32, C42 is connected to the other end of the AC power source AC1 via each of four resistors R12, R22, R32, R42. Since the AC power source AC1 and the battery cells E1, E2, E3 E4 are not connected to each other at the same potential, and the AC power source AC1 and the battery cells E1, E2, E3 E4 are insulated from each other by the capacitors C11, C21, C31, C41, C12, C22, C32, C42, it is apt to be affected by the common mode noise Vn.

Figure 9A:
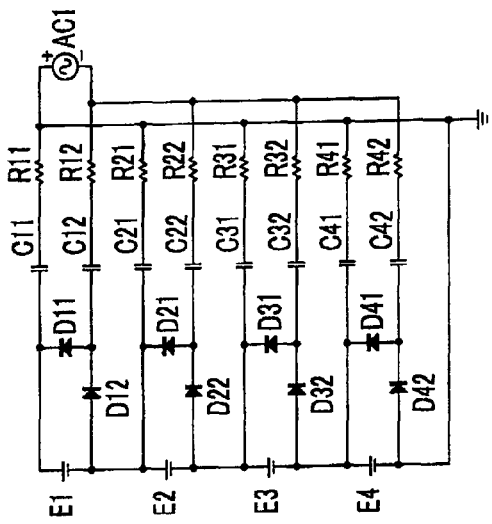
FIG. 9A to FIG. 9C show a comparative example of the charging device according to the present invention.
Figure 9B:
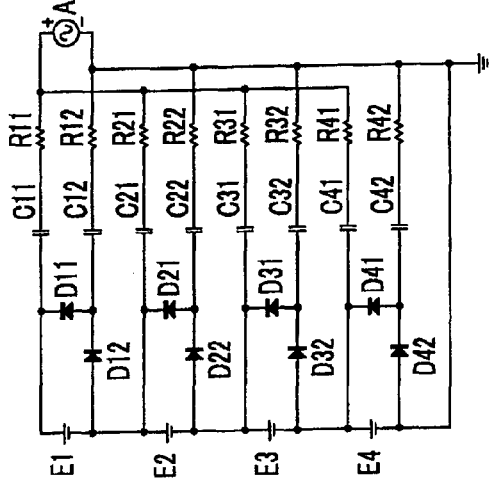
Figure 9C:
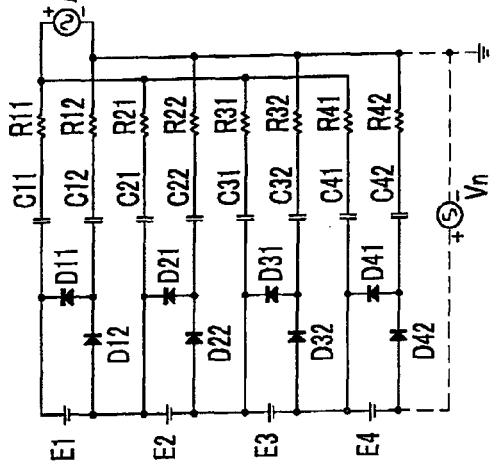

FIG. 9B and FIG. 9C shown the circuit diagrams in which the negative electrode of the battery cell E4 is connected to one end of the AC power source AC1 to try to avoid the effect of the common mode noise Vn (see FIG. 9A). However, in the case where the resistor R12 and the negative electrode of the battery cells E4 are connected to each other at the same potential as shown in FIG. 9B, the AC current simply flows through the resistor R11, the capacitor C11 and the battery cells E1, E2, E3 E4, and no battery cell is charged. Also, in the case where the resistor R11 and the negative electrode of the battery cells E4 are connected to each other at the same potential as shown in FIG. 9C, an AC voltage is applied to the connection point of each of the diodes D11, D21, D31, D41 and each of the diodes D12, D22, D33, D42. In such a circuit diagram, the AC current will flow through the capacitors C12, C22, C32, C42, but no current in any direction will flow through the capacitors C11, C21, C31, C41. Thus, the circuit diagram as shown in FIG. 9C actually has the same configuration as that of the first embodiment (see FIG. 1).

Figure 10A:
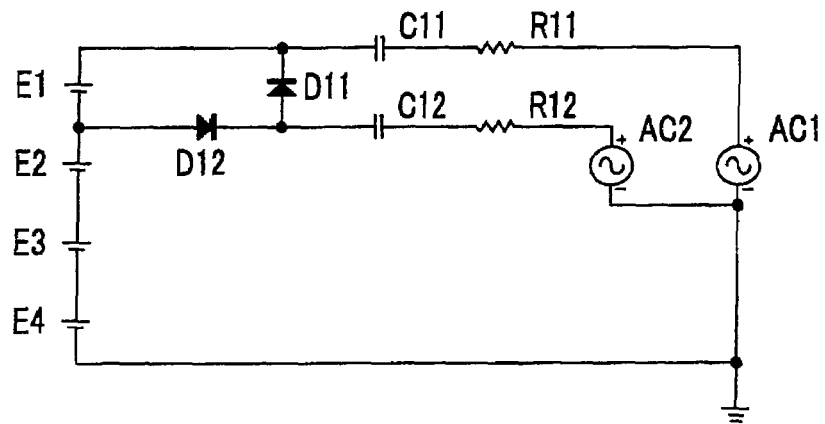
FIG. 10A to FIG. 10C are used to discuss the comparative example of the charging device according to the present invention.
Figure 10B:
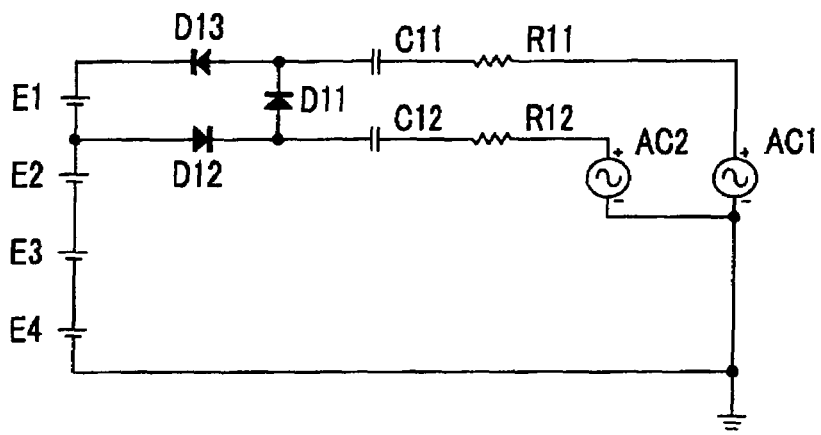

The circuit diagram of FIG. 9A will be discussed below from other viewpoints with reference to the FIG. 10A to FIG. 10C. There are two AC power sources connected to the reference potential as shown in FIG. 10A and FIG. 10B. Similar to FIG. 9A and FIG. 9C, the negative electrode of the battery cell E4 is used as the reference potential to avoid the effect of the common mode noise Vn. Incidentally, in FIG. 10A and FIG. 10B, only the circuit diagrams relevant to the battery cell E1 are indicated, and the circuit diagrams relevant to the battery cells E2, E3, E4 are omitted.

In the circuit diagram of FIG. 10A, the AC power source AC1 simply allows the AC current to flow through the battery cells E1, E2, E3 E4 via the resistor R11 and the capacitor C11, and the battery cell E1 is not charged. When the voltage of AC power source AC2 is a positive voltage, the AC power source AC2 allows a positive direction current to flow through the battery cells E1, E2, E3 E4 via the resistor R12, the capacitor C and the diode D11. When the voltage of AC power source AC2 is a negative voltage, the AC power source AC2 allows a negative direction current to flow via the resistor R12, the capacitor C and the diode D11 to discharge the battery cells E2, E3 E4. As a result, only the battery cell E1 is charged, and the battery cells E2, E3, E4 are not charged.

In the circuit diagram of FIG. 10B, a diode D13 is inserted between the positive electrode of the battery cell E1, and the capacitor C11 and the diode D11. The phase difference between the AC power source AC1 and the AC power source AC2 is 180 degrees. When the voltage of AC power source AC1 is a positive voltage and the voltage of AC power source AC2 is a negative voltage, a current will flow through a path of: the resistor R11, the capacitor C11, the diode D13, the battery cell E1, the diode D12, the capacitor C12, and the resistor R12. On the other hand, when the voltage of AC power source AC1 is a negative voltage and the voltage of AC power source AC2 is a positive voltage, a current will flow through a path of: the resistor R12, the capacitor C12, the diode D11, the capacitor C11, and the resistor R12. As a result, only the battery cell E1 is charged, and the battery cells E2, E3, E4 are not charged.

Figure 10C:
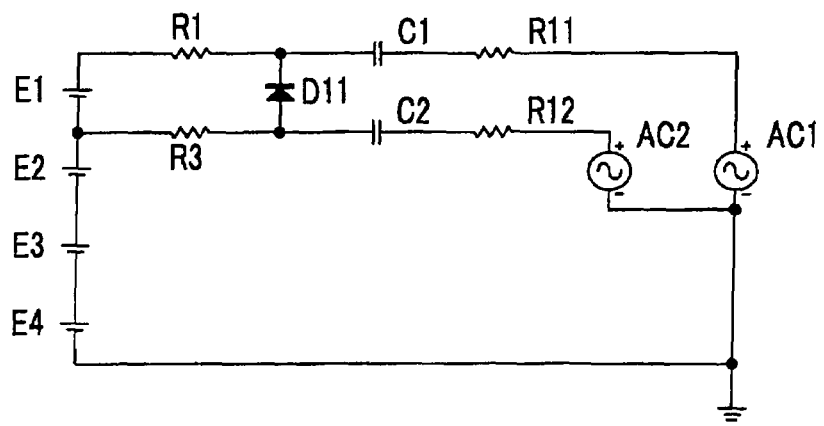

The charging device shown in FIG. 10C is formed by replacing the diode D13 of the charging device shown in FIG. 10B with a resistor R1 and replacing the diode D12 with a resistor R3. When the voltage of AC power source AC1 is a positive voltage and the voltage of AC power source AC2 is a negative voltage, a charging current will flow through the battery cell E1 via a path of: the resistor R11, the capacitor C1, the resistor R1, the battery cell E1, the resistor R3, the capacitor C2, and the resistor R12. When the voltage of AC power source AC1 is a negative voltage and the voltage of AC power source AC2 is a positive voltage, there are two paths through which the currents respectively flow. A first path is: the resistor R12, the capacitor C2, the diode D11, the capacitor C1, the resistor R11; while a second path is: the resistor R12, the capacitor C2, the resistor R3, the battery cell E1, the resistor R1, the capacitor C1, the resistor R11.

With such a configuration, although the number of the diodes can be reduced, the electric charge charged to the battery cell E1 is discharged through the second path. Incidentally, in the case where the AC power source AC1 and the AC power source AC2 have the same amplitude, where the capacitor C1 and the capacitor C2 have the same capacitance, where the resistor R1 and the resistor R3 have the same resistance, and where the resistor R11 and the resistor R12 have the same resistance, the battery cells E2, E3 E4 will not be charged.

<Modifications>

The present invention should not be limited to the above embodiments, but should include various modifications such as the following.

Figure 11A:
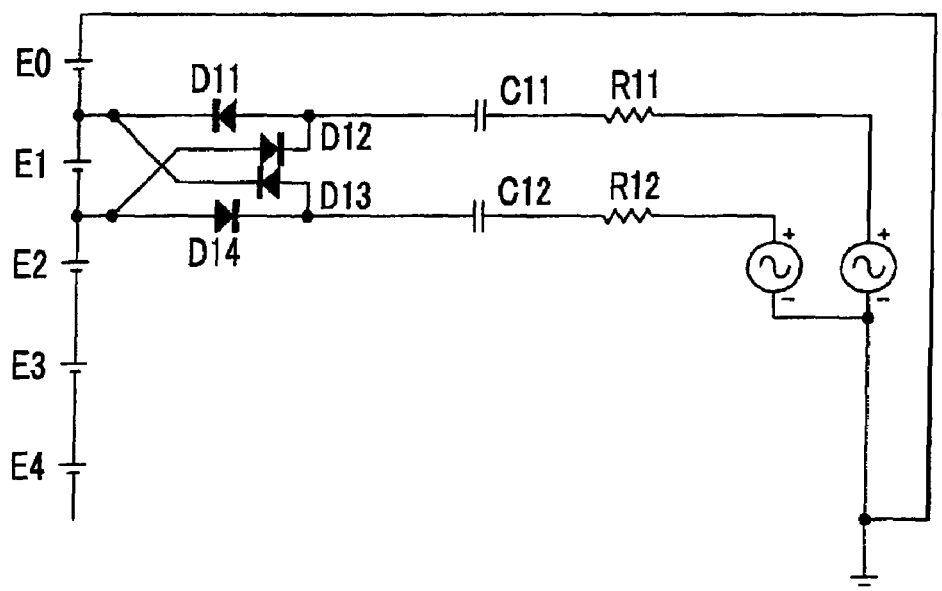
FIG. 11A shows a modification of the charging device according to the present invention.
Figure 11B:
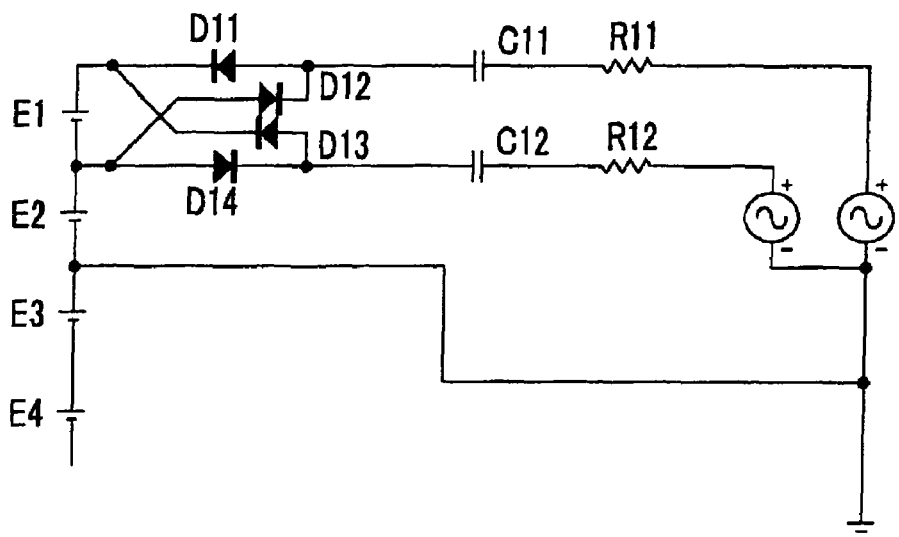
FIG. 11B shows another modification of the charging device according to the present invention.

(1) Although the negative electrode of the battery cell En is used as the reference potential of the switches S12, S22 of the pulse applying circuit 35 in the second embodiment, any other battery cells E1, E2, . . . , En-1 can be used as the reference potential. Specifically, FIG. 11A shows an example in which the positive electrode, which has the maximum potential, of the battery cell E0 is used as the reference potential, and 11B shows an example in which the negative electrode, which is a midpoint potential, of the battery cell E2 (namely, the positive electrode of the battery cell E3) is used as the reference potential.

Figure 12:
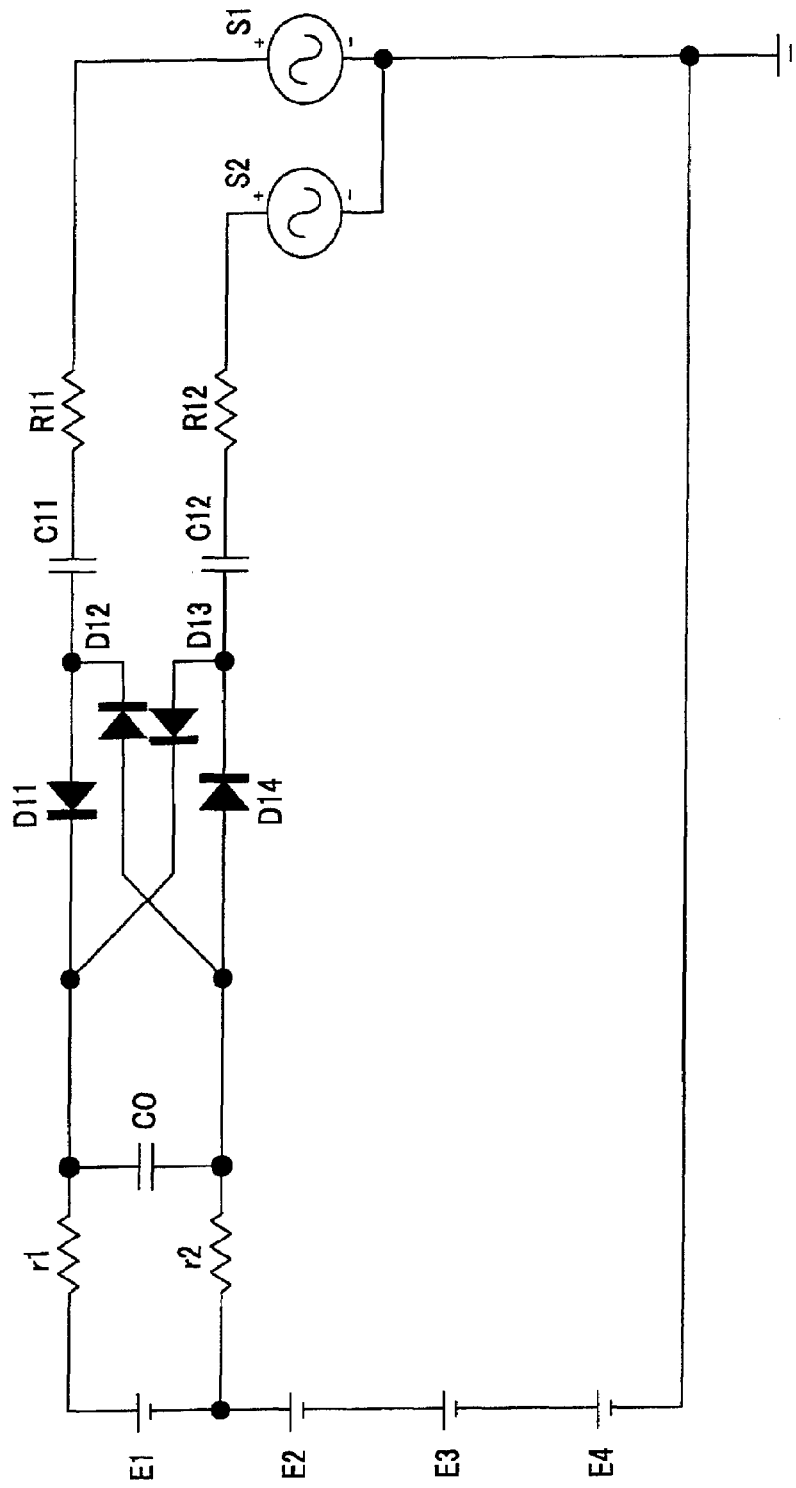
FIG. 12 shows a further another modification of the charging device according to the present invention.

(2) In the second embodiment, since the diodes D11, D12, D13, D14 are directly connected to the battery cells E1, E2, . . . , En, the current $I_C$ flowing through the battery cell E1 includes pulsating noise components as shown in FIG. 8E. However, the noise can be removed by employing a configuration shown in FIG. 12 in which one end of each of resistors r1, r2 is connected to the respective ends of the battery cell E1, and the other end of each of resistors r1, r2 is connected to the respective ends of a capacitor C0.

(3) Although the rectangular wave generated by the pulse applying circuit 30, 35 is used to drive the charging circuit 10 in the above embodiments, a sine wave can be alternatively used to drive the charging circuit 10.

(4) Although a resistor is provided in the current flow path to restrict the current in the above embodiments, the same effect also can be achieved by providing an inductor instead of the resistor. Further, the same effect also can be achieved by providing a series circuit formed by a resistor and an inductor so that the current can be restricted with the resistor having lower resistance, and thereby the electric power consumed by the resistor can be reduced. The resistor and/or the inductor for restricting the current can be provided at any place in the current flow path, and also, the resistor and/or the inductor can be divided into a plurality of resistors and/or the inductors. Further, when the resonant frequency of the circuit including the inductor and the capacitor is approximated to the frequency of the rectangular wave voltage, there is a possibility that the voltage applied to battery cells E1, E2, . . . , En becomes higher than the rectangular wave voltage generated by the pulse applying circuit 30, 35. In such a case, it does not cause any problem if the rectangular wave voltage generated by the pulse applying circuit 30, 35 is lower than the voltage of the battery cells E1, E2, . . . , En.

(5) Although the battery 20 is used as the electric accumulator in the above embodiments, a super capacitor can alternatively be used as the electric accumulator.

What is claimed is:

1. A charging device comprising:
an electric accumulator formed by a plurality of series-connected electric accumulator cells, one electrode of any one of the electric accumulator cells being used as a reference potential of the electric accumulator;
at least one capacitor having one end fixed to the potential of one electrode of each of the electric accumulator cells or fixed to the potential of the other electrode of any one of the electric accumulator cells through a rectifying means; and
a periodical power source connected between the capacitor and the reference potential of the electric accumulator to generate repetitive signals,
wherein the periodical power source includes a first periodical power source and a second periodical power source which has an inverted phase with respect to the first periodical power source, and
wherein the capacitor includes a first capacitor and a second capacitor, the other end of the first capacitor being fixed to the voltage of the first periodical power source and the other end of the second capacitor being fixed to the voltage of the second periodical power source.

2. The charging device according to claim 1,
wherein the periodical power source is a rectangular wave power source which alternately outputs a high momentary voltage and a low momentary voltage, and
wherein the rectifying means fixes the one end of the capacitor either to the potential of the one electrode or to the potential of the other electrode, whichever is higher, when the rectangular wave power source outputs the high momentary voltage, and fixes the one end of the capacitor either to the potential of the one electrode or to the potential of the other electrode, whichever is lower, when the rectangular wave power source outputs the low momentary voltage.

3. A charging device capable of charging any one of a plurality of series-connected electric accumulator cells which form an electric accumulator, the charging device comprising:
- a charging circuit; and
- a rectangular wave power source,
- wherein the charging circuit has a plurality of sub circuits for each of the electric accumulator cells, the sub circuits each having a first diode, a second diode and a capacitor, an anode of the first diode and a cathode of the second diode being connected to one end of the capacitor, a cathode of the first diode being connected to a positive electrode of each of the electric accumulator cells, an anode of the second diode being connected to a negative electrode of each of the electric accumulator cells,
- wherein the rectangular wave power source applies a rectangular wave voltage to the other end of the capacitor of any one of the sub circuits of the charging circuit; and
- wherein at least one of a resistor and an inductor is provided in a current flow path between the electric accumulator and the rectangular wave power source.

4. A charging device capable of charging any one of a plurality of series-connected electric accumulator cells which form an electric accumulator, the charging device comprising:
- a charging circuit; and
- a rectangular wave power source,
- wherein the charging circuit has a plurality of sub circuits for each of the electric accumulator cells, the sub circuits each having a first diode, a second diode, a third diode, a fourth diode, a capacitor and a second capacitor, an anode of the first diode and a cathode of the second diode being connected to one end of the first capacitor, a cathode of the first diode being connected to a positive electrode of each of the electric accumulator cells, an anode of the second diode being connected to a negative electrode of each of the electric accumulator cells, an anode of the third diode and a cathode of the fourth diode being connected to one end of the second capacitor, a cathode of the third diode being connected to a positive electrode of each of the electric accumulator cells, an anode of the fourth diode being connected to a negative electrode of each of the electric accumulator cells, and
- wherein the rectangular wave power source applies a rectangular wave voltage to the other end of the first capacitor and applies an inverted voltage obtained by inverting the rectangular wave voltage to the other end of the second capacitor of any one of the sub circuits of the charging circuit, and
- wherein a center voltage of the rectangular wave voltage has a fixed potential difference from a center voltage of the inverted voltage.

5. The charging device according to claim 3,
- wherein one electrode of any one of the electric accumulator cells has the same potential as a reference potential of the rectangular wave power source.

6. The charging device according to claim 4,
- wherein one electrode of any one of the electric accumulator cells has the same potential as a reference potential of the rectangular wave power source.

7. The charging device according to claim 4,
- wherein one electrode of any one of the electric accumulator cells has the same potential as a reference potential of the rectangular wave power source.

8. The charging device according to claim 4,
- wherein at least one of a resistor and an inductor is provided in a current flow path between the electric accumulator and the rectangular wave power source.

9. The charging device according to claim 4,
- wherein at least one of a resistor and an inductor is provided in a current flow path between the electric accumulator and the rectangular wave power source.

10. The charging device according to claim 5,
- wherein at least one of a resistor and an inductor is provided in a current flow path between the electric accumulator and the rectangular wave power source.

11. The charging device according to claim 6,
- wherein at least one of a resistor and an inductor is provided in a current flow path between the electric accumulator and the rectangular wave power source.

12. The charging device according to claim 7,
- wherein at least one of a resistor and an inductor is provided in a current flow path between the electric accumulator and the rectangular wave power source.

* * * * *